United States Patent [19]
Galler et al.

[11] Patent Number: 5,883,665
[45] Date of Patent: Mar. 16, 1999

[54] TESTING SYSTEM FOR SIMULATING HUMAN FACULTIES IN THE OPERATION OF VIDEO EQUIPMENT

[75] Inventors: Bruce I. Galler, Boulder; Jamie C. Su, Thornton; Stephanie M. Zwolinski, Westminster, all of Colo.

[73] Assignee: Lucent Technologies Inc., Murray Hill, N.J.

[21] Appl. No.: 938,402

[22] Filed: Sep. 26, 1997

[51] Int. Cl.[6] ........................................... H04H 1/00
[52] U.S. Cl. ........................... 348/192; 348/16; 455/4.1
[58] Field of Search .................. 348/180, 6, 7, 348/8, 10, 12, 13, 14, 15, 16, 191, 192, 193; 455/3.1, 4.1, 4.2, 5.1, 6.1, 6.2, 6.3, 67.1; 379/29, 28

[56] References Cited

U.S. PATENT DOCUMENTS

| | | | |
|---|---|---|---|
| 4,945,554 | 7/1990 | Krause et al. | 379/10 |
| 5,369,634 | 11/1994 | Denissen | 348/180 |
| 5,446,492 | 8/1995 | Wolf et al. | 348/180 |
| 5,596,364 | 1/1997 | Wolf et al. | 348/180 |
| 5,734,422 | 3/1998 | Maurer et al. | 348/180 |
| 5,748,229 | 5/1998 | Stoker | 348/180 |

OTHER PUBLICATIONS

A.A. Webster et al., *An Objective Video Quality Assessment System Based on Human Perception*, Institute for Telecommunication Sciences, National Telecommunications and Information Admin., Boulder, CO.
*The Effect of Multiple Scenes on Objective Video Quality Assessment*, Document No. T1A1.5/92–136, Jul. 13, 1992, pp. 1–2.
*Preliminary Results of One–Way Video Delay Measurement Algorithms*, Document No. T1A1.5/92–139, Jul.. 13, 1992, pp. 1–18.
*Objective Performance Parameters for NTSC Video at the DS3 Rate*, Document No. T1A1.5/93–60, Apr. 28, 1993, pp. 1–17.
*Real–Time Measurement System for ITS Video Quality Parameters*, Document No. T1A1.5/93–105, Aug. 9, 1993, pp. 1–11.
*An In–depth Analysis of the $P_6$ Lost Motion Energy Parameter*, Document No. T1A1.5/95–103, Jan. 9, 1995, pp. 1–9.
*Objective Measures for Detecting Digital Tiling*, Document No. T1A1.5/95–104, Jan. 9, 1995, pp. 1–13.
*An Analysis Technique for Detecting Temporal Edge Noise*, Document No. T1A1.5/95–105, Jan. 9, 1995, pp. 1–6.

*Primary Examiner*—Andrew I. Faile
*Assistant Examiner*—Sam Huang
*Attorney, Agent, or Firm*—John C. Moran

[57] ABSTRACT

Emulating human faculties of sight, image, and hand control by a testing system to interact with a multimedia switching system. The testing system can control a multimedia video unit by the transmission of infrared command signals emulating a user actuating buttons on a hand-held infrared transmitter unit to verify that the system responds correctly to such actuations. Also, the testing system can analyze quality of images to be transmitted, transmit those images through the switching system via user multimedia video units, receive those signals at other user multimedia video units, and analyze the quality of the resulting video images. Further, the testing system can place varying levels of multimedia traffic through the multimedia switching system. Further, the testing system can test call control performed by the multimedia switching system by utilizing an infrared transmitter unit to place and receive calls. The multimedia switching system utilizes text that is displayed on the multimedia video units to indicate call state. The testing system identifies the text that is being displayed at different states of the call and determines if the multimedia switching system is functioning properly.

8 Claims, 6 Drawing Sheets

TESTING SYSTEM FOR SIMULATING HUMAN FACULTIES IN THE OPERATION OF VIDEO EQUIPMENT

TECHNICAL FIELD

This invention relates to testing, and, in particular, to the testing of a video communication system.

BACKGROUND OF THE INVENTION

In the prior art it is known to do automatic testing of telecommunications switching systems. Such testing systems function by electrically connecting to telephone links coming from the telecommunications switching system. The testing system then can place calls through the telecommunications switching system to another telephone link that is also terminated by the testing system. To verify that an audio path is set up through the telecommunications switching system, the testing system transmits a multifrequency dialing tone through the telecommunications system and utilizes a multifrequency detection circuit to recognize the tone. Recognition of the tone verifies that an audio path has been set up through the telecommunications switching system. Such testing systems are utilized to place varying amounts of telephone traffic through the telecommunications switching system to verify that the telecommunications switching system can handle these various levels of traffic.

Such testing systems are not only used during the development of a telecommunications switching system to verify that the various features operate and that the telecommunications switching system has the necessary call transport capability but also during manufacturing. During the manufacturing, telecommunications switching systems testing systems are utilized to verify that the telecommunications switching system is functioning. In addition, the features associated with each telephone link are loaded into the testing system, and the testing system verifies that the various features assigned individually to the telephone links are available on those links with no additional features being available on the telephone links.

With the advent of multimedia communication switching systems, the problem of testing has become much more difficult. The actual capability of the switching network under test to reliably and accurately communicate a video and voice transport must be carefully tested. In addition, new mechanisms for controlling a multimedia terminal are emerging rather than simple signalling protocols that have been traditionally used on telephone links. Finally, the complexity of the terminal features that are available and, hence, must be tested, are increasing dramatically with the introduction of multimedia communication switching systems.

SUMMARY OF THE INVENTION

The foregoing problems are solved, and a technical advance is achieved by a testing system that has the capability of interacting with a multimedia switching system by emulating the human faculties of sight, image, and hand control. The testing system can control a multimedia video unit by the transmission of infrared command signals emulating a user actuating buttons on a hand-held infrared transmitter unit to verify that the system responds correctly to such actuations. Further, the testing system can analyze quality of images to be transmitted, transmit those images through the switching system via user multimedia video units, receive those signals at other user multimedia video units, and analyze the quality of the resulting video images. Further, the testing system can place varying levels of multimedia traffic through the multimedia switching system.

Further, the testing system can test call control performed by the multimedia switching system by utilizing an infrared transmitter unit to place and receive calls. Advantageously, the multimedia switching system utilizes text that is displayed on the multimedia video units to indicate call state. The testing system identifies the text that is being displayed at different states of the call and determines if the multimedia switching system is functioning properly. If errors are detected, the testing system indicates these errors and maintains a log so that a summary can be provided at the end of a long testing period.

In addition, the testing system allows for a multimedia video unit to be remoted some distance from the multimedia switching system. Using a remote testing unit allows the testing of the multimedia switching system over actual transmission systems. Further, the testing system maintains a quality inventory of the video quality of the multimedia switching system over a long period of time. The inventory allows the overall effects of changing various pieces of equipment both in the multimedia switching system and in the multimedia video units to be determined.

In order to test advanced video features provided by the multimedia switching system such as fast forward, reverse, and pause, the testing system utilizes video programming material that has state codes and frame numbers inserted into the video picture that is to be displayed on the multimedia units. Using the state codes and frame numbers, the testing system can generate user commands to the multimedia switching system and determine if the multimedia switching system is performing properly.

DETAILED DESCRIPTION

Figure 1:
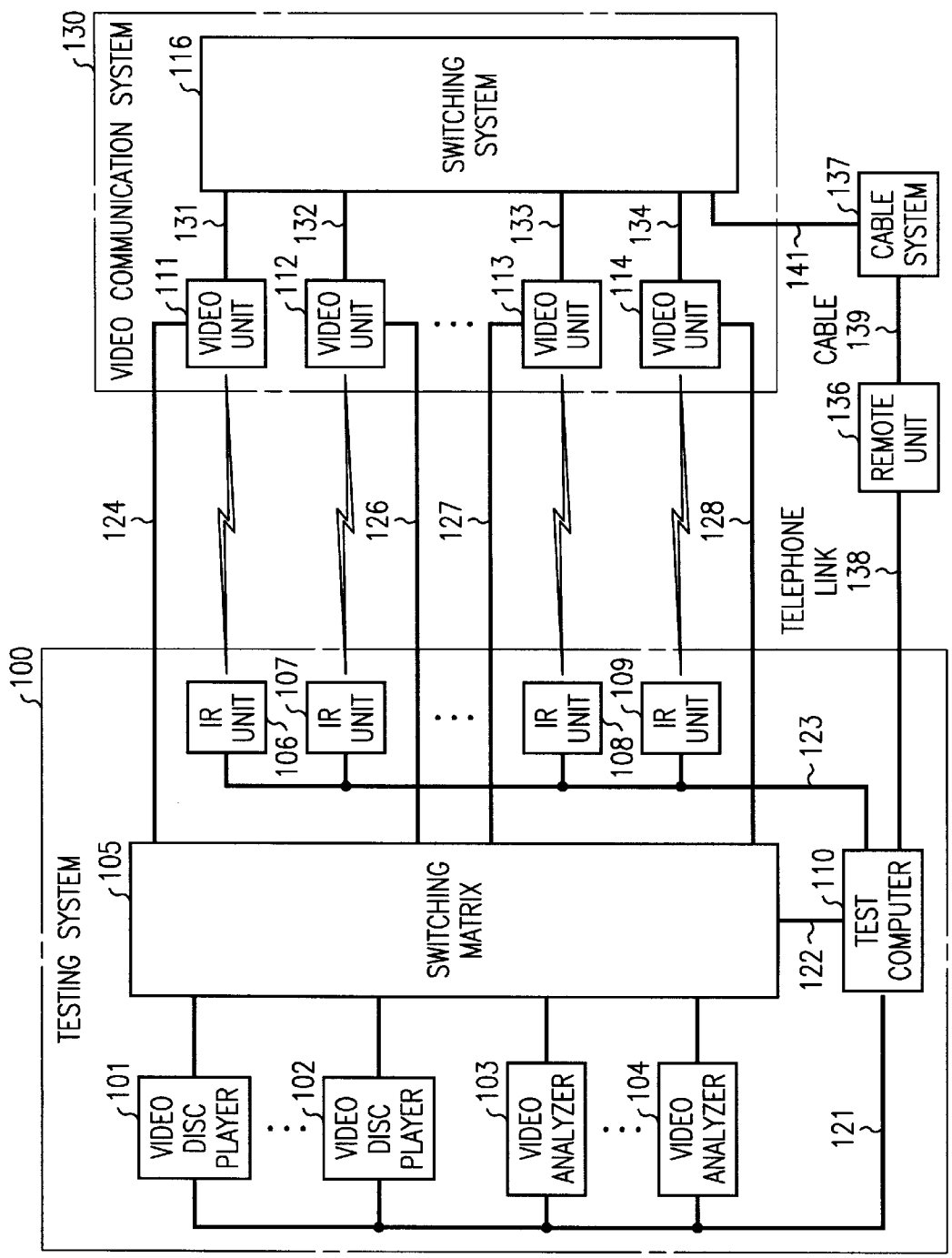
FIG. 1 illustrates a testing system interconnected with a video communication system.

FIG. 1 illustrates testing system 100 interconnected to video communication system 130. Within video communication system 130, video units 111–114 are interconnected to switching system 116 via links 131–134. Each video unit has a video camera, a video display, audio input, and audio output. In normal operation, a video unit is controlled by a user utilizing an infrared (IR) hand held transmitter. The user selects various features by actuating buttons on the IR transmitter. Switching system 116 comprises a switching network and a control processor for providing features and interconnection to video units 111–114. Testing system 100 is used to emulate users. Testing system 100 is under the control of test computer 110. Test computer controls switching matrix 105 to connect video disk players 101–102 and video analyzers 103–104 to the video units. In addition, test computer 110 simulates the IR transmitter by sending commands to IR units 106–109 that retransmit these commands as IR information to video units 111–114, respectively. Each video unit is interconnected via switch-matrix 105 to allow access to the video picture being received by the video unit from switching system 116. This interconnection allows the video received by the video unit to be analyzed and allows injection of a video picture from a video disk player into the video unit for transmission to switching system 116. Test computer 110 utilizes the video information on the video disk players 101–102 to transmit information through switching system 116 via switching matrix 105 and video units 111–114. Video analyzers 103–104 are utilized to determine the presence and quality of video pictures being communicated by switching system 116 to video units 111–114. Test computer 110 can also test the functions of multimedia switching system 116 over remote transmission path 141 by utilizing remote unit 136. Testing computer 110 interacts with remote unit 136 via telephone link 139. Remote unit 136 has a built in IR unit, video unit, video analyzer and video disk player.

Consider the following example. Test computer 110 utilizing IR unit 106 transmits commands to video unit 111. In response to these commands, video unit 111 originates a video call to video unit 114. Test computer 110 then controls switching matrix 105 and video disk player 101 to transmit a video picture via cable 124 to video unit 111. Video unit 111 is responsive to the video picture to transmit that picture to switching system 116 via link 131. Test computer 110 detects the call arrival at video unit 114 by using video analyzer 104 to detect the video picture that signals an incoming call. Once the call is set up, test computer 110 then can utilize video disk player 101 to transmit a variety of video picture sequences to test the capability of switching system 116 to deliver these sequences reliably to video unit 114. In addition, test computer 110 connects video disk player 102 to video unit 114 via switching matrix 105 and causes video pictures to be sent through switching system 116 to video unit 111. Test computer 110 verifies that this second path through switching system 116 is functioning correctly by connecting video analyzer 104 through switching matrix 105 to video unit 111. Test computer 110 can proceed to set up any number of calls utilizing video units and to perform such actions as video conferencing and detecting that the video conferencing is being correctly done. The video conference features may include such features as a split screen that shows all conferees, enlarging the conferee speaking, or allowing one conferee to perform the selection of which conferee will be displayed on the video display units of all video units participating in the video conference.

Switching matrix 105 may advantageously be a Utah Scientific Switcher or any other switching unit capable of switching video signals. The video analyzers advantageously may be Matrox image-LC image processing systems or any other video analyzer capable of doing frame grabbing and image analysis.

Figure 2:
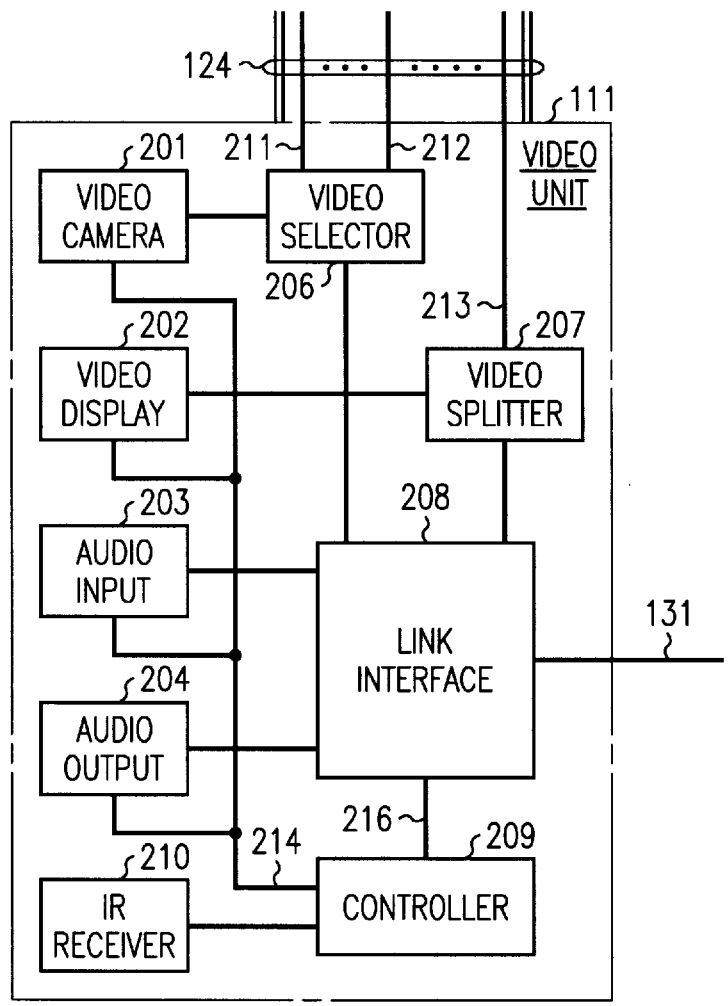
FIG. 2 illustrates, in block diagram form, a video unit for use with a video communication system.
Figure 3:
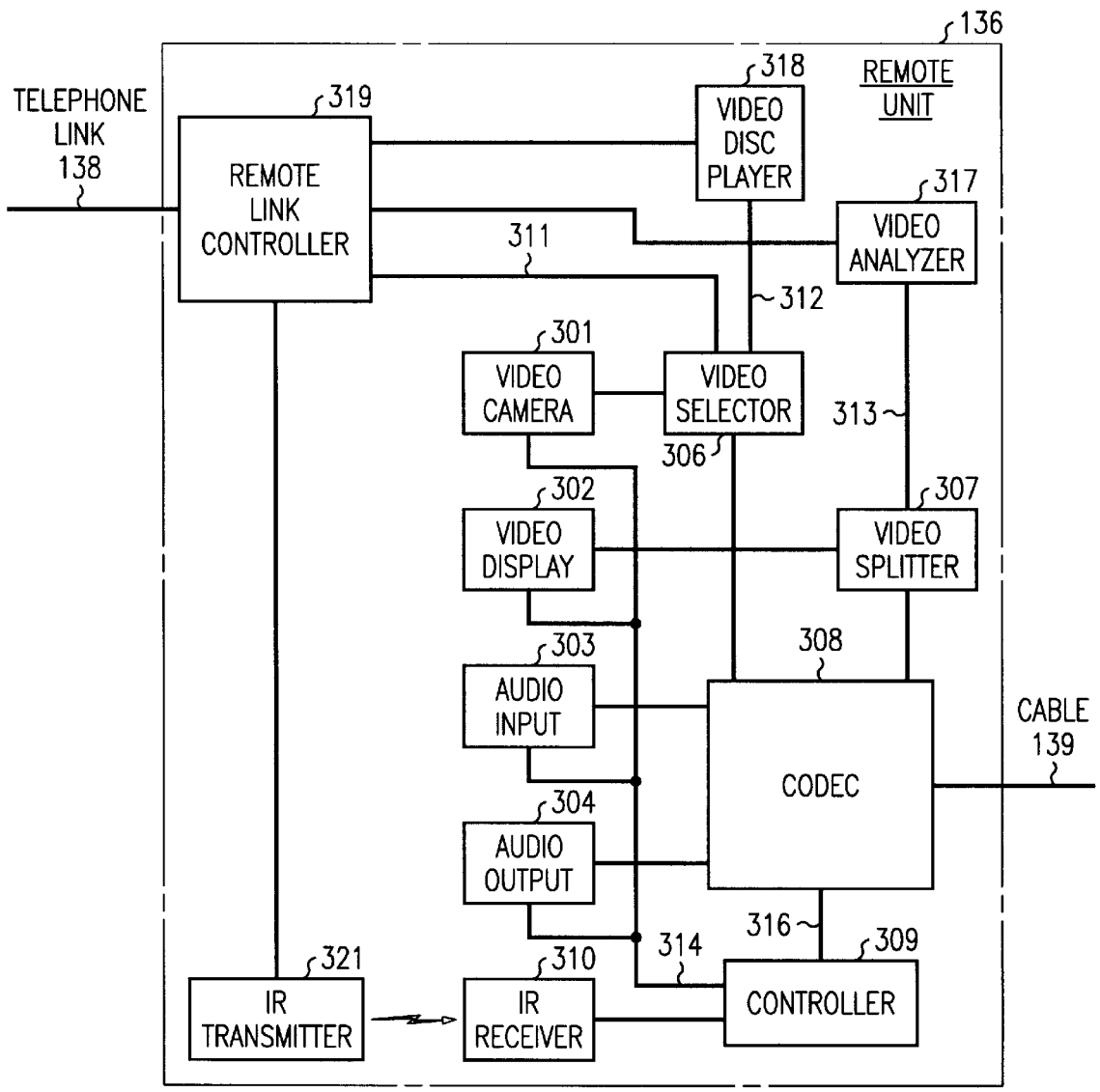
FIG. 3 illustrates, in block diagram form, a remote unit for use with a video communication system.

FIG. 2 illustrates the details of video unit 111. The other video units are similar in composition. Link interface 208 is responsible for transmission and reception of information on link 131. Link interface 208 is responsive to control information on link 131 to transmit that information via bus 216 to controller 209. Link interface 208 is responsive to control information from controller 209 intended for switching system 116 to transmit that controller information on link 13 1. Link interface 208 is responsive to incoming video information to communicate the video information received from link interface 208 via video splitter 207 to video display 202 and to conductor 213 of cable 124 which is connected to switching matrix 105. Link interface 208 transmits audio information received from switching system 116 to audio output 204. Similarly, link interface 208 receives audio information from audio input 203 combines that audio information with video information received from video selector 206 for transmission on link 131 to switching system 116. Testing computer 110 via switching matrix 105 and conductor 211 of cable 124 controls whether video selector 206 communicates the output of video camera 201 to link interface 208 or the video information being received on conductor 212 from switching matrix 105.

Test computer 110 transmits commands to controller 209 via IR unit 106 and IR receiver 210. By transmission of commands to controller 209, test computer 110 can send control information to switching system 116 via link interface 208 and controller 209. The transmission of these commands from IR unit 106 not only tests that switching system 116 is functioning properly in different situations but also verifies that IR receiver 210, controller 209 and link interface 208 are functioning properly in the various situations.

Figure 4:
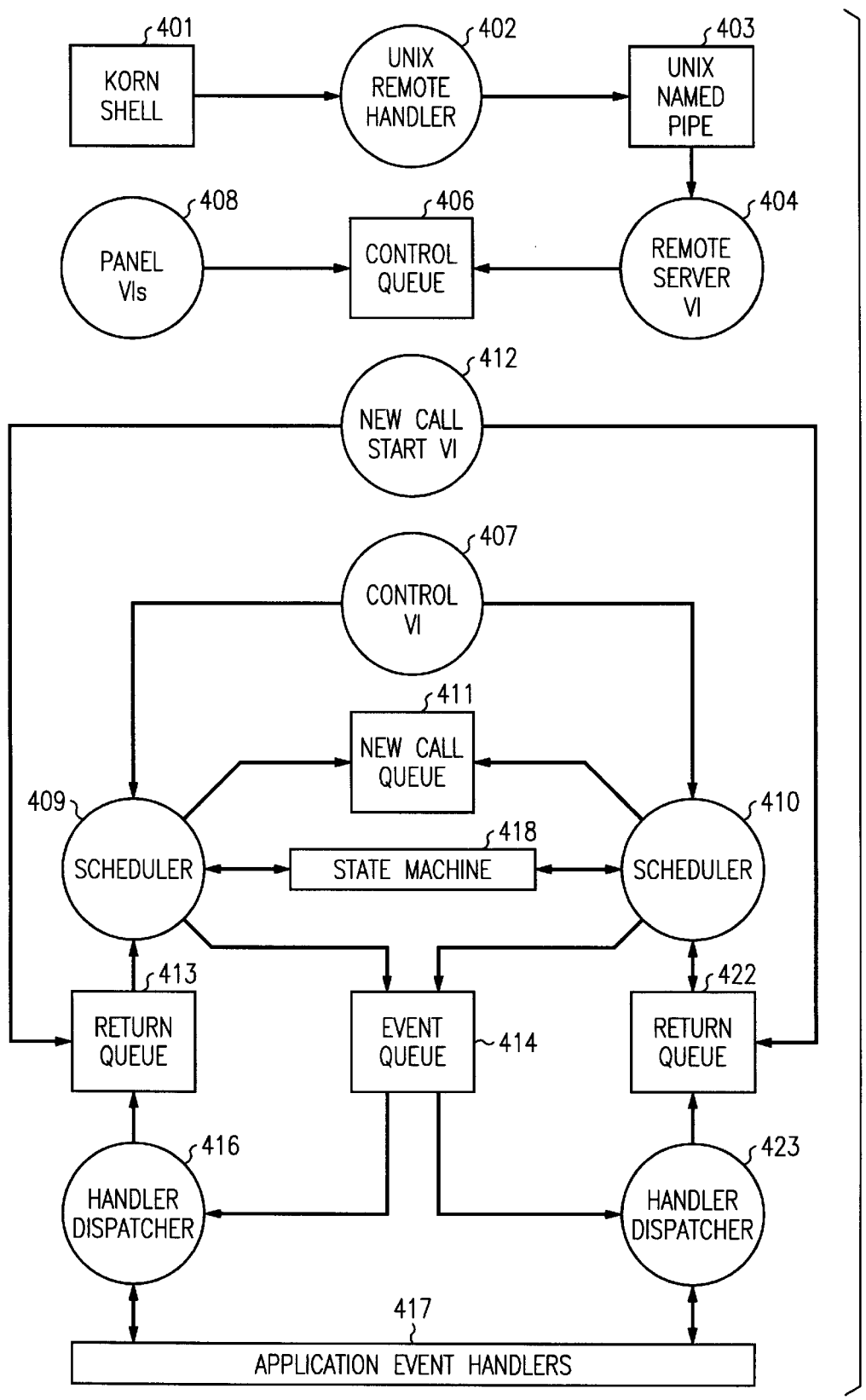
FIG. 4 illustrates a software architecture for controlling a testing system.

FIG. 4 illustrates the software structure that is being executed by test computer 110 of FIG. 1. In FIG. 4, with the exception of elements 401, 402, 403, and 418, the elements illustrated are written in the LabVIEW language. LabVIEW language is a product of National Instruments Inc. and runs under the Sun Open Windows environment The elements of FIG. 4 with the exception of the previously designated elements that are represented as circles are LabVIEW virtual instruments (VIs). LabVIEW is a graphical language that is well known by those skilled in the art. Each VI is basically a subroutine encapsulated into a graphical node. Each VI has a panel where controls (inputs) and indicators (outputs) can be chosen to define its call interface. The VI also has a wiring diagram, where its functionality is defined by wiring together functional nodes (sub VI nodes, constants, etc.) A VI can also be implemented as a code interface node (CIN), which is an ANSI C function with a special LabVIEW link interface. All VIs have a custom icon associated with them, and they can be wired together to connect inputs and outputs together. VIs which have no direct data dependency (i.e., are not wired together) will run in parallel. LabVIEW supports this asynchronous environment by providing its own internal scheduler and mutual exclusion mechanisms.

The central concept of the design illustrated in FIG. 4 is the call model. This is an application defined by a collection of parameters which describes a class of calls by specifying the kinds of tests to conduct, the subset of resources to utilize, the types of statistics to collect, the frequency, duration and distribution of calls. One such call model is a background call model which allows a low priority background load to be placed on video communication system 130 by testing system 100 while other call models are being executed. A call model can be executed via a UNIX command using elements 401–403 and 404.

Each call model has its own scheduler that is used to generate a call event request. Schedulers 409 and 410 are illustrated. For example, these call event requests are placed in event queue 414 and eventually are processed by handler dispatcher 416. A call event is application defined, and can be anything as coarse as resetting power to a device, to as fine grained as sending out a single digit for a dialing sequence. Scheduler 409 utilizes state machine 418. State machine 418 takes an existing call state and call model as input and generates the next event to be scheduled. Handler dispatcher 416 is a simple dispatcher, invoking the appropriate event handling function based upon the scheduled events it receives from event queue 414. Handler dispatcher 416 is capable of processing only one event at a time, so multiple copies of the handler exist in the system for increased parallelism. Application event handlers 417 perform the low level control of such devices as video analyzer 103 of FIG. 1.

In FIG. 4, each call model is defined by a panel VI from panel VIs 408. Each panel VI defines a plurality of objects based on the graphical context of the panel. These objects are identified by a control packet. The control packet is then placed in control queue 406. Control VI 407 accesses control queue 406 and based on the requested call model transfers the call model to one of schedulers 409–410. The scheduler receives information defining where the panel is stored with the objects.

For example, scheduler 409 is responsive to such call model information to place a new call request into new call queue 411. New call start VI 412 is responsive to such information to dispatch calls as required in accordance with the call model defining these calls. New call start VI 412 places a call token defining the new call into return queue 413 or 422. The token defines the call setting forth the call model and any state information that is necessary to start the call. If the call model requires six calls an hour for a particular call model, the new call start VI is responsive to the call model to dispatch a token for a new call into a return queue every ten minutes. Note that the return queue chosen is the return queue for the scheduler being used for that particular call model.

As way of an example, consider the operation of scheduler 409 to a token for a new call. Scheduler 409 extracts the token for the new call from return queue 413. Scheduler 409 then invokes state machine 418 utilizing the new call token. State machine 418 utilizing state definitions as set forth in Appendix A determines the event that needs to take place to start the call. State machine 418 returns this event to scheduler 409 which places the event on event queue 414. Handler dispatcher 416 takes the event to start the new call from event queue 414 and determines which application event handler in element 417 is necessary to actuate this event. For example, one application event handler simply simulates a video terminal going off hook. The application event handlers are LabVIEW modules which call low level routines written in the C language that actually perform the control functions on each particular interface unit of testing system 100. Such operations are well known to those skilled in the art. Appendix B defines the states of the various call types. Appendix C sets forth the C language source code for state machine 418. In addition, Appendix D defines the instruction set of the code given in Appendix C.

When an action takes place on the hardware illustrated in FIG. 1, the appropriate application event handler reports the occurrence of an event to handler dispatcher 416 in the present example. Handler dispatcher 416 then places a token of the occurrence onto return queue 413. The token placed on return queue 413 defines the call, the state of the call, and the physical occurrence. Scheduler 409 is responsive to the call token on return queue 413 to invoke state machine 418 which determines the next event that should occur. Scheduler 409 then puts this event embedded in a call token onto event queue 414.

Similar actions are performed by remote unit 136 of FIG. 1 as to those previously described. The exception is that the information to set up the call and the occurrence of physical information is transferred via elements 401–404 into the software architecture illustrated in FIG. 4.

Figure 5:
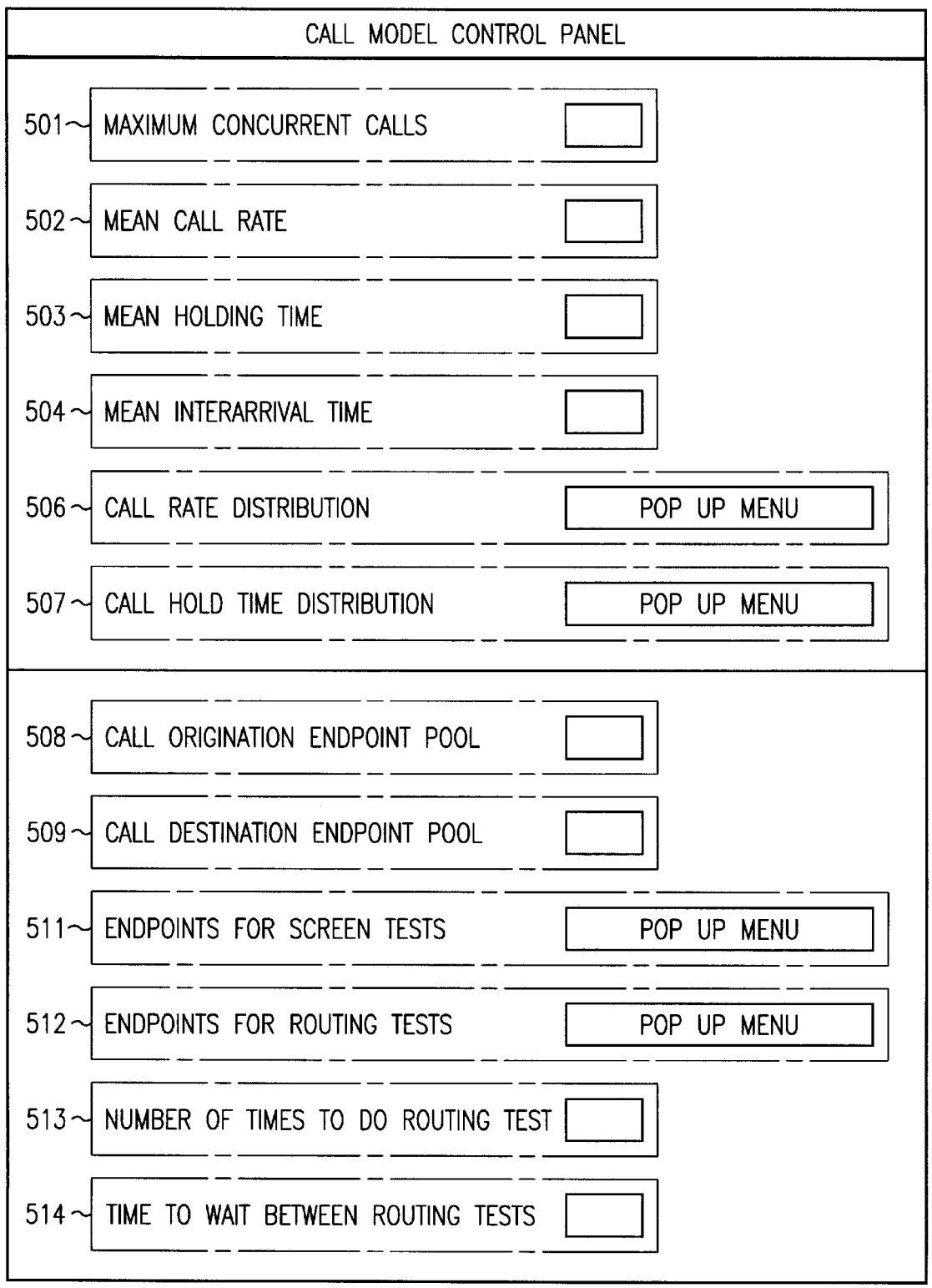
FIG. 5 illustrates a control panel virtual instrument.
Figure 6:
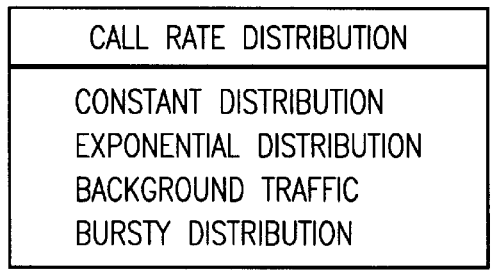
FIGS. 6–9 illustrate different menus of a control panel virtual instrument.
Figure 7:
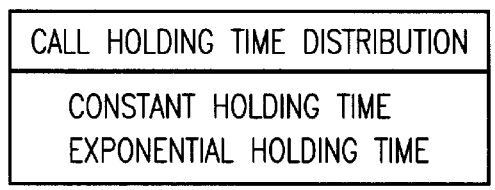

FIG. 5 illustrates a typical call model control panel implemented in the LabVIEW language. The control panel is broken up into a plurality of sections 501–514 with each section defining certain aspects of the call model. To utilize the call model, a user designates an entry for each of the sections. Section 501 determines the maximum number of concurrent calls that can be established for the call model. Section 502 determines the mean call rate per hour. Section 503 defines the mean holding time in seconds, and section 504 defines the mean interarrival time in seconds. Section 506 defines the call rate distribution and utilizes a pop-up menu which is defined in FIG. 6. As illustrated in FIG. 6, the user can select the calls to have constant, exponential, or bursty distribution. In addition, FIG. 6 allows the calls to be performed as background traffic. Section 506 defines the call hold time distribution in a pop-up menu illustrated in FIG. 7. As defined in FIG. 7, the user can select constant or exponential holding time.

Figure 8:
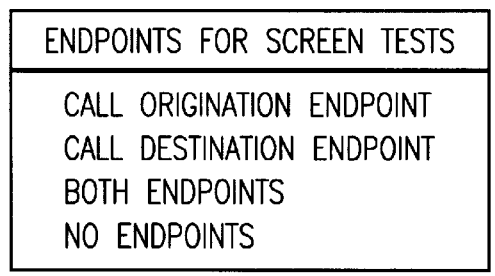
Figure 9:
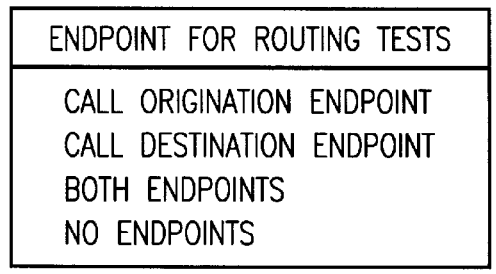

Section 508 allows the user to specify the call origination endpoint pool that will be utilized for the call model by the entry of a pool number in the designated box. Similarly, section 509 allows the user to designate the call destination endpoint pool. Section 511 allows the user to define the endpoints for the screen test utilizing a pop-up menu defined in FIG. 8. As illustrated in FIG. 8, the user can define endpoints for screen tests as call origination endpoint, call destination endpoint, both endpoint, or no endpoints. Section 512 defines the endpoints for routing tests in a pop-up menu illustrated in FIG. 9. As illustrated in FIG. 9, the user can define endpoints for routing tests as call origination endpoint, call destination endpoint, both endpoints, or no endpoints. Section 513 defines the number of times to do a routing test by entry of a number in the designated box. Section 514 defines the wait time between routing tests by entry of a number in the designated box.

It is to be understood that the above-described embodiment is merely illustrative of the principles of the invention and that other arrangements may be devised by those skilled in the art without departing from the spirit or scope of the invention.

invention claimed is:

1. A method for testing a multimedia switching system interconnected to a plurality of multimedia video units using a plurality of video analyzers, a plurality of video disk players, a video switch for interconnecting the plurality of video analyzers and the plurality of video disk players to the plurality of multimedia video units, a plurality of remote control units each for controlling an individual one of the plurality of multimedia video units, and a test computer controlling the video switch, the plurality of video analyzers, the plurality of video disk players, and the plurality of remote control units, comprising the steps of:

signaling by the test computer a first one of the plurality of multimedia video units via a first one of the plurality of remote control units to place a multimedia call through the multimedia switching system to a second one of the plurality of multimedia video units;

controlling by the test computer the video switch to interconnect a first one of the plurality of video disk players to the first one of the plurality of multimedia video units and to interconnect a first one of the plurality of video analyzers to the second one of the plurality of multimedia video units;

sending by the first one of the plurality of video analyzers in response to detection of the call setup video frame information a first message to the test computer defining that an incoming multimedia call is being received by the second one of the plurality of multimedia video units;

signaling by the test computer in response to receipt of the first message the first one of the plurality of video disk players to transmit first video frame information to the first one of the plurality of multimedia video units via the video switch and transmitting by the test computer to the first one of the plurality of video analyzers identification information defining the first video frame information;

signaling by the test computer in response to receipt of the first message the second one of the plurality of multimedia video units via a second one of the plurality of remote control units to answer the multimedia call;

sending by the first one of the plurality of video analyzers in response to detection of the first video frame information a second message to the test computer defining that the first video frame information is being received by the second one of the plurality of multimedia video units;

recording by the test computer in response to receipt of the second message a successful call completion; and recording a first error by the test computer in response to the first and second message not being received.

2. The method of claim 1 further comprises the steps of analyzing by the first one of the plurality of video analyzers in response to the first video frame information the quality of the received first video frame information to determine if the quality is above a predefined level and transmitting by the first one of the plurality of video analyzers a third message to the test computer upon the quality being below the predefined level; and recording a second error by the test computer in response to the third message.

3. The method of claim 2 further comprises the steps of determining by the test computer a lapse of a predefined interval;

sequentially establishing by the test computer in response to the lapse of the predefined interval individual connections between each individual one of the plurality of multimedia video units to each other individual one of the plurality of multimedia video units;

connecting via the video switch by the test computer in response to the establishment of each connection between each individual one of the plurality of multimedia video units to each other individual one of the plurality of multimedia video units an individual one of the plurality of video disk players to each individual one of the plurality of multimedia video units and for connecting an individual one of the plurality of video analyzers to each other individual one of the plurality of multimedia video units;

further analyzing the video frame information for quality information by each interconnected one of the plurality of video analyzers in response to video frame information; and storing the quality information by the test computer in response to quality information from each interconnected one of the video analyzers.

4. The method of claim 2 wherein a third one of the plurality of multimedia video units is interconnected remotely to the multimedia switching system via a transmission system, a remote test unit communicates with the test computer via telecommunication facilities, and the remote test unit having a remote control unit for controlling the third one of the plurality of multimedia video units, a video disk player, a video analyzer, and the method further comprises the steps of:

signaling by the test computer the third one of the plurality of multimedia video units via the remote control unit in the remote test unit to place a multimedia call through the multimedia switching system to the second one of the plurality of multimedia video units;

controlling by the test computer the video switch to interconnect the first one of the plurality of video analyzers to the second one of the plurality of multimedia video units;

sending by the first one of the plurality of video analyzers in response to detection of the call setup video frame information a third message to the test computer defining that an incoming multimedia call is being received by the second one of the plurality of multimedia video units;

signaling by the test computer in response to receipt of the third message the video disk player in the remote test unit to transmit the first video frame information to the second one of the plurality of multimedia video units via the transmission system and the multimedia switching system;

signaling by the test computer in response to receipt of the third message the second one of the plurality of multimedia video units via a second one of the plurality of remote control units to answer the multimedia call; and sending by the first one of the plurality of video analyzers in response to detection of the first video frame information a fourth message to the test computer defining that the first video frame information is being received by the second one of the plurality of multimedia video units.

5. An apparatus for testing a multimedia switching system interconnected to a plurality of multimedia video units, comprising:

a plurality of video analyzers;

a plurality of video disk players;

a video switch interconnecting the plurality of video analyzers and the plurality of video disk players to the plurality of multimedia video units;

a plurality of remote control units each controlling an individual one of the plurality of multimedia video units;

a test computer controlling the video switch, the plurality of video analyzers, the plurality of video disk players, and the plurality of remote control units;

the test computer signaling a first one of the plurality of multimedia video units via a first one of the plurality of remote control units to place a multimedia call through the multimedia switching system to a second one of the plurality of multimedia video units;

the test computer controlling the video switch to interconnect a first one of the plurality of video disk players to the first one of the plurality of multimedia video units and to interconnect a first one of the plurality of video analyzers to the second one of the plurality of multimedia video units;

the first one of the plurality of video analyzers in response to detection of the call setup video frame information sending a first message to the test computer defining that an incoming multimedia call is being received by the second one of the plurality of multimedia video units;

the test computer in response to receipt of the first message signaling the first one of the plurality of video disk players to transmit first video frame information to the first one of the plurality of multimedia video units via the video switch and transmitting to the first one of the plurality of video analyzers identification information defining the first video frame information;

the test computer in response to receipt of the first message signaling the second one of the plurality of multimedia video units via a second one of the plurality of remote control units to answer the multimedia call;

the first one of the plurality of video analyzers in response to detection of the first video frame information sending a second message to the test computer defining that the first video frame information is being received by the second one of the plurality of multimedia video units;

the test computer in response to receipt of the second message recording a successful call completion; and the test computer in response to the first and second message not being received recording a first error.

6. The apparatus of claim 5 wherein the first one of the plurality of video analyzers in response to the first video frame information analyzing the quality of the received first video frame information to determine if the quality is above a predefined level and transmitting a third message to the test computer upon the quality being below the predefined level; and the test computer in response to the third message further recording a second error.

7. The apparatus of claim 6 wherein the test computer further determines a lapse of a predefined interval;

the test computer in response to the lapse of the predefined interval further sequentially establishing individual connections between each individual one of the plurality of multimedia video units to each other individual one of the plurality of multimedia video units;

the test computer in response to the establishment of each connection between each individual one of the plurality of multimedia video units to each other individual one of the plurality of multimedia video units further connecting via the video switch an individual on e of the plurality of video disk players to each individual one of the plurality of multimedia video units and further connecting an individual one of the plurality of video analyzers to each other individual one of the plurality of multimedia video units;

each interconnected one of the plurality of video analyzers in response to video frame information further analyzing the video frame information for quality information; and the test computer in response to quality information from each interconnected one of the video analyzers further storing the quality information.

8. The apparatus of claim 6 wherein a third one of the plurality of multimedia video units is interconnected remotely to the multimedia switching system via a transmission system and the apparatus further comprises a remote test unit that communicates with the test computer via telecommunication facilities and the remote test unit comprising:

a remote control unit controlling the third one of the plurality of multimedia video units;

a video disk player;

a video analyzer;

the test computer further signaling the third one of the plurality of multimedia video units via the remote control unit in the remote test unit to place a multimedia call through the multimedia switching system to the second one of the plurality of multimedia video units;

the test computer further controlling the video switch to interconnect the first one of the plurality of video analyzers to the second one of the plurality of multimedia video units;

the first one of the plurality of video analyzers in response to detection of the call setup video frame information sending a third message to the test computer defining that an incoming multimedia call is being received by the second one of the plurality of multimedia video units;

the test computer in response to receipt of the third message further signaling the video disk player in the remote test unit to transmit the first video frame information to the second one of the plurality of multimedia video units via the transmission system and the multimedia switching system;

the test computer in response to receipt of the third message her signaling the second one of the plurality of multimedia video units via a second one of the plurality of remote control units to answer the multimedia call; and the first one of the plurality of video analyzers in response to detection of the first video frame information sending a fourth message to the test computer defining that the first video frame information is being received by the second one of the plurality of multimedia video units.

* * * * *